United States Patent [19]

Melec et al.

[11] Patent Number: 5,073,441
[45] Date of Patent: Dec. 17, 1991

[54] MESH STRUCTURE WITH HIGH RESISTANCE TO PIERCING AND TEARING

[75] Inventors: Didier Melec, Chemin de La Tuilerie; Claudine You, Cité des Castors; Geneviéve Lefere, Montigny-Les-Metz; Claudine Peres, Le Bouscat, all of France

[73] Assignee: Societe Civile D'Inventeurs SPML, France

[21] Appl. No.: 481,656

[22] Filed: Feb. 14, 1990

Related U.S. Application Data

[63] Continuation of Ser. No. 282,944, Dec. 6, 1988, abandoned, which is a continuation of Ser. No. 933,138, Nov. 21, 1986, abandoned.

[51] Int. Cl.$^5$ .............................................. B32B 7/00
[52] U.S. Cl. .................................... 428/254; 66/171; 66/202; 428/253; 428/283; 428/402; 428/407; 428/902
[58] Field of Search ............... 428/253, 254, 902, 283, 428/402, 407; 66/84 A, 85 A, 171, 202, 169 R, 170

[56] References Cited

U.S. PATENT DOCUMENTS

| | | | |
|---|---|---|---|
| 4,563,382 | 1/1986 | Viel | 428/296 |
| 4,615,934 | 10/1986 | Ellison | 428/254 |
| 4,786,549 | 11/1988 | Richards | 428/296 |

Primary Examiner—James J. Bell
Attorney, Agent, or Firm—Fulbright & Jaworski

[57] ABSTRACT

The invention concerns a novel mesh structure with high resistance in particular to piercing and tearing.

The object of the invention is a novel mesh structure with high resistance in particular to piercing and to tearing, characterized in that it comprises a knit structure, the texture of which is formed of an entirety of forward meshes comprising a quilting stitch, two cylindrical reverses and a flat weft, repeated every eight drops, with the threads constituting the knit being formed of polyaramide fibers.

The invention is useful in the fashioning of clothing, linings or walls for protective and/or safety purposes.

7 Claims, 1 Drawing Sheet

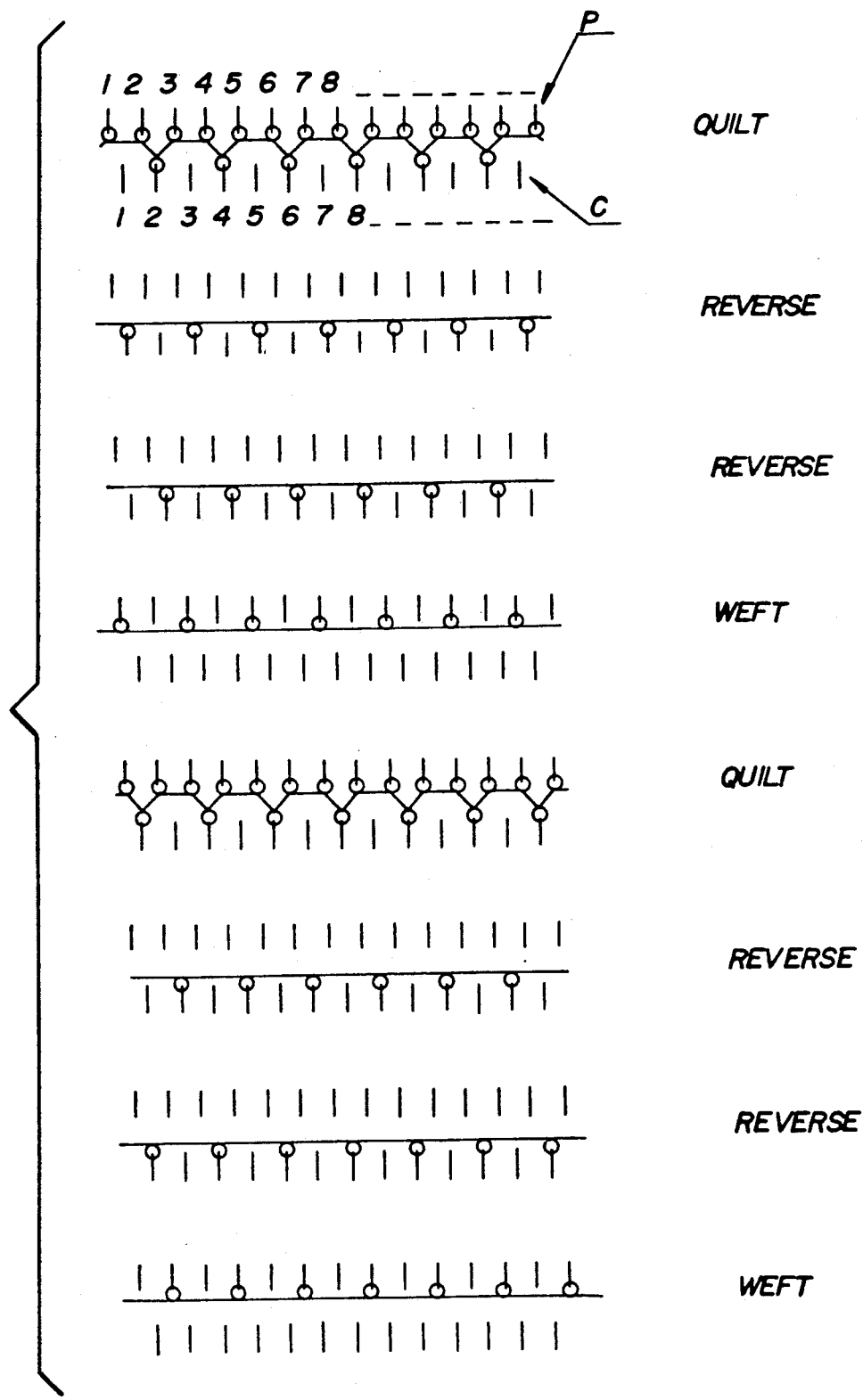

MESH STRUCTURE WITH HIGH RESISTANCE TO PIERCING AND TEARING

This application is a continuation of application Ser. No. 282,944 filed Dec. 6, 1988, now abandoned, which is a continuation of application Ser. No. 933,138 filed Nov. 21, 1986 now abandoned.

The present invention concerns a novel mesh structure capable of forming different sheathings or walls with high resistance to piercing and tearing, for safety purposes or the protection of persons or objects.

It is the object of the invention to provide a safety or protective structure that is both more resistant and lighter than the structures presently in use.

For this purpose, the invention relates to a novel mesh structure with high resistance to piercing and tearing, characterized in that it comprises a knitted fabric the texture of which is formed by a combination of forward meshes comprising a quilt, two cylindrical reverses and a flat weft, with repetition every eight drops, the threads constituting the knit being formed by polyaramide fibers.

Such a structure may be used for example as a protective netting or fabric.

In other applications the structure is lined by coating with a thermoplastic resin, such as polyvinyl chloride or polyurethane, for tightness, in order to produce protective clothing, such as butcher's aprons, which is remarkably strong and effective, while having a weight that is considerably less than that of the usual protective clothing of the coat of mail type.

For still other applications the structure is impregnated with a resin of various types, in order to obtain a more or less rigid structure which is particularly resistant to piercing and tearing.

Further characteristics and advantages will become apparent from the description given below merely as an example and with reference to the drawing attached hereto, the single FIGURE of which illustrates the knitting method of the structure according to the invention.

BRIEF DESCRIPTION OF THE DRAWING

The FIGURE shows the knitting sequence according to an embodiment of the invention.

In the FIGURE, P and C indicate respectively the rows of needles with two knitting heads, flat and cylindrical, of a circular knitting frame, with eight drops, numbered 1 to 8, being shown in the FIGURE.

The texture of the knit is formed by an assembly of forward meshes comprising a quilt, two cylindrical reverses and a flat weft, repeated every eight drops.

The texture of the knit, which is run-proof, makes it possible to use polyaramide fibers, commonly known under the commercial name of "KEVLAR", for example fibers of the metric number of 1/56.

In addition to the possibility of using these fibers in such a structure which exhibits a highly remarkable resistance to piercing and tearing in particular, it may be lined by coating with a thermoplastic resin such as polyvinyl chloride or polyurethane.

The resin forms a continuous film covering one or even both faces of the knit fabric.

The thickness of the plastic material is of the order of some tenths of a millimeter to several millimeters.

The plastic material may be applied for example by deposition and spreading with a squeegee or by calendering between a hot and a cold cylinder, with one face of the knit being coated in this case.

A plastic coating of this type mainly provides tightness.

A structure coated in this manner makes it possible to fashion safety and protective professional clothing, such as butcher's aprons or the like, which are distinguished by their resistance in particular to piercing and tearing, and which are considerably more effective in this respect than conventional mail mesh protective clothes and also significantly lighter.

Thus, a butcher's apron made from a mesh structure according to the invention has a weight of approximately 900 grams per square meter, while the mail mesh type aprons at the present time weigh 13 to 14 kg/m$^2$.

Such a coated structure may also be used for the fashioning of flexible closed containers, under pressure or reduced pressure, practically unpuncturable and untearable. In these applications a tight thermoplastic film may be interposed advantageously between the mesh structure and the coating layer, which preferably comprises PVC or polyurethane.

In still other applications the above-described structure is impregnated, instead of coated, with a resin by any known means.

Resins of different types may be used depending on the properties desired in the final structure. The following may be cited as suitable resins: thermosetting resins, in particular phenolic plastics, amino plastics, epoxies, unsaturated polyesters, polyurethanes, cross-linked substances, alkyds, thermoplastic resins, in particular polyvinyls, polyolefins, celluloses, polyamides, special polymers such as saturated polyesters, linear polyurethanes, polycarbonates, or elastomers, such as silicone, natural and synthetic rubbers and their derivatives.

The resin may optionally be filled with reinforcing powders, pulverized or micronized.

The structure impregnated in this manner is more or less rigid depending on the nature of the matrix and may be used for the production of fencing masks, sport clothes, canoe walls, ULM sails, etc., for example.

We claim:

1. A novel mesh structure with high resistance in particular to piercing and tearing, characterized in that it comprises a knit fabric the texture of which is formed of an entirety of forward meshes comprising a quilting stitch, two cylindrical reverses and a flat weft, repeated every eight drops, the threads forming the knit comprising polyaramide fibers.

2. The mesh of claim 1 further comprising a coating of a resin applied to at least one surface thereof.

3. The mesh of claim 2 wherein said resin comprises polyurethane.

4. The mesh of claim 2 wherein said resin comprises polyvinylchloride.

5. The mesh of claim 2 wherein a thermoplastic film is interposed between said coating and said mesh.

6. The mesh of claim 2 wherein said resin includes a reinforcing powder.

7. An article of manufacture comprising polyaramide fiber threads in forward meshes repeated every eight drops, said mesh consisting essentially of: (a) a quilting stitch; (b) two cylindrical reverses; and (c) a flat weft.

* * * * *